(12) United States Patent
Hillberg et al.

(10) Patent No.: US 6,333,863 B1
(45) Date of Patent: Dec. 25, 2001

(54) METHOD TO COMPENSATE FOR UNBALANCED LOADS IN POLYPHASE SYSTEMS

(75) Inventors: Claes Hillberg, Möhlin; Gerhard Linhofer, Baden-Dättwil, both of (CH)

(73) Assignee: ABB (Schweiz) AG, Baden (CH)

( * ) Notice: Subject to any disclaimer, the term of this patent is extended or adjusted under 35 U.S.C. 154(b) by 0 days.

(21) Appl. No.: 09/664,092

(22) Filed: Sep. 19, 2000

(30) Foreign Application Priority Data

Sep. 20, 1999 (DE) ................................ 199 44 917

(51) Int. Cl.[7] .......................... H02M 5/45; H02M 5/458; G05F 1/70
(52) U.S. Cl. ...................... 363/37; 323/207; 323/217
(58) Field of Search .................. 363/37; 323/205, 323/207, 215, 217

(56) References Cited

U.S. PATENT DOCUMENTS

| | | | |
|---|---|---|---|
| 5,627,742 | * 5/1997 | Nakata et al. | 363/98 |
| 5,864,474 | * 1/1999 | Jang | 363/39 |
| 6,172,488 | * 1/2001 | Mizutani et al. | 323/207 |

FOREIGN PATENT DOCUMENTS

19737590C1   10/1998   (DE) ............... H02M/1/12

OTHER PUBLICATIONS

März, Von G., "Die Blindleistungsschwankungen bei Lichtbogenöfen und ihre Kompensation mit Hilfe elektronisch regelbarer Phasenschieber", in Elektrowärme International 30, 1972, B1, Feb., S.B40–B44.

Sonnenschein, M., et al, "Shunt–Connected Power Conditioner for Improvement of Power Quality in Distribution Networks," in Int. Conf. on Harmonics and Quality of Power, Las Vegas, Nev., U.S.A., Oct. 16–18, 1996.

L. Gyungyi et al., "Principles and Applications of Static, Thyristor–Controlled Shunt Compensators", IEEE Transactions on Power Apparatus and Systems, Vo. PAS–97, No. 5, Sep./Oct. 1978.

Y. Sundberg, "On the balancing of single–phase loads on power networks", ASEA Journal, vol. 52, No. 5, 1979.

* cited by examiner

*Primary Examiner*—Bao Q. Vu
(74) *Attorney, Agent, or Firm*—Burns, Doane, Swecker & Mathis, L.L.P.

(57) ABSTRACT

The method according to the invention is for compensation currents to be produced which have arbitrary phases and/or arbitrary amplitudes. To this end, a compensation unit (5) is proposed which is connected to the polyphase system via a transformer unit (4). The compensation unit (5) in this case comprises at least a switching unit (6) and an energy storage unit (7), which is connected to the transformer unit (4) via the switching unit (6).

11 Claims, 3 Drawing Sheets

METHOD TO COMPENSATE FOR UNBALANCED LOADS IN POLYPHASE SYSTEMS

This application claims priority under 35 U.S.C. §§119 and/or 365 to Application Ser. No. 199 44 917, filed in Germany on Sep. 20, 1999; the entire content of which is hereby incorporated by reference.

FIELD OF THE INVENTION

The present invention relates to a method as claimed in the pre-characterizing clause of patent claim 1, and to an apparatus for carrying out the method.

BACKGROUND OF THE INVENTION

Electrical power is mainly and preferably supplied via balanced three-phase systems. Unequal loads between the individual phases result in such three-phase systems becoming unbalanced, which furthermore results in power losses or damage in electrical machines which are connected to the three-phase system. Unbalanced three-phase systems are in this case distinguished not only by unbalanced currents and phases but, in particular, also by unbalanced voltages, to be precise owing to the different voltage drops in the individual paths.

The said unbalanced voltages in particular have a negative effect on electrical machines which are connected to the three-phase system. Depending on the extent of the unbalance, increased power losses occur first of all, then reduced life, and, finally, machine failure. For this reason, International Standards and Recommendations have been issued in which the maximum permissible level of unbalance in a three-phase system has been defined (Engineering Recommendation, IEC—The Electrical Council, London, June 1975, page 16).

An unbalance in a three-phase system may occur, for example, due to a single-phase induction furnace, due to a single-phase propulsion system which is connected directly to the three-phase system, or due to an arc furnace, which in principle admittedly represents a three-phase load, but in which an unbalance can occur briefly when one or two arcs are quenched.

One known method to compensate for unbalanced loads was proposed by Ch. P. Steinmetz (L. Gyugyi et. al, Principle and Applications of static, thyristor-controlled Shunt Compensators, IEEE Transactions on Power Apparatus and Systems, Vol. PAS-97, No. 5, September/October 1978, pages 1935to 1945 and, in this case, in particular page 1936, left-hand column). Steinmetz was able to show that a resistive load contained between two phases of a three-phase system can be compensated for by connecting a capacitance of suitable size and an inductance of suitable size between the phase to which the resistive load is connected and the phase which is not loaded by the resistive load. In this case, Steinmetz assumed that this was a pure resistive load. If this condition is not satisfied, then additional complications are involved in order to make it possible to correct the power factor as well.

The aim of a compensating load may theoretically be achieved firstly by eliminating the so-called negative-sequence system (L. Gyugyi et. al, Principle and Applications of static, thyristor-controlled Shunt Compensators, IEEE Transactions on Power Apparatus and Systems, Vol. PAS-97, No. 5, September/October 1978, page 1937, right-hand column), and secondly by correcting the power factor. This can be achieved in a known manner by providing a compensation circuit in triangular form, comprising reactive elements such as capacitors and inductances.

With the availability of power switches—such as thyristors—the power factor can be corrected as required, that is to say it has even been possible to balance three-phase systems with widely varying loads. A circuit developed on this principle is described and explained in the abovementioned article by Gyugyi et. al. (page 1942, right-hand column, FIG. 14).

This known circuit for compensating for unbalanced loads has the disadvantage, however, that no volt-ampere optimization is provided. For this reason, the losses are correspondingly high.

SUMMARY OF THE INVENTION

The present invention is thus based on the object of specifying a method which does not have the abovementioned disadvantages.

The invention has the following advantages: since the compensation currents produced in the compensation unit may have arbitrary phases and arbitrary amplitudes, the invention means that the volt-ampere rating can be considerably reduced in order to achieve the same level of compensation as is possible by means of the known compensation circuit by Steinmetz.

The method according to the invention works optimally particularly when the amplitudes of the compensation currents are of equal magnitude. The compensation circuit paths are thus equally loaded.

Furthermore, the method according to the invention is distinguished by exchanging real power between at least two phases, to be precise via an energy buffer store, which is preferably in the form of a capacitor.

BRIEF DESCRIPTION OF THE DRAWINGS

The invention will be explained in more detail in the following text with reference, by way of example, to drawings, in which.

DETAILED DESCRIPTION OF THE INVENTION

Figure 1:
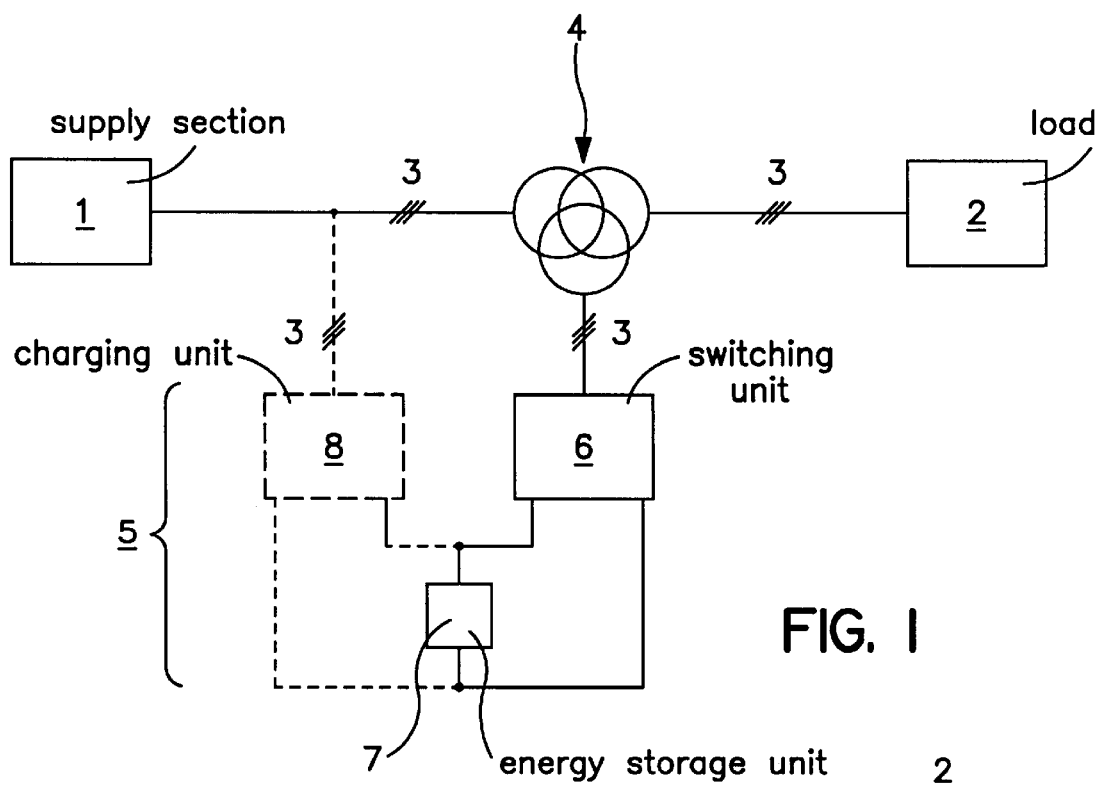
FIG. 1 shows a schematic illustration of an arrangement to compensate for unbalanced loads in a three-phase system.

FIG. 1 shows a schematic illustration of an arrangement according to the invention to compensate for an unbalanced load in a three-phase system, with 1 denoting a supply section—for example a generator—and 2 denoting the unbalanced load. In FIG. 1, connections between the parts of the network are denoted by 3, whereas these are the three cables of the three-phase system.

A three-phase transformer unit 4 is provided between the supply section 1 and the load 2, via which transformer a compensator unit 5 is coupled to the transmission path between the supply section 1 and the load 2. For its part, the compensator unit 5 initially comprises a switching unit 6 and an energy storage unit 7, with the input side of the switching unit 6 being connected to the three-phase transformer unit 4, and its output side being connected to the energy storage unit 7.

Dashed lines in FIG. 1 show a further embodiment of the arrangement according to the invention. In this embodiment, which will be described in addition to that just described, a charging unit 8 is thus provided, whose input side is connected in parallel to the energy storage unit 7 and whose output side is in turn connected to the transmission path between the supply section 1 and the load 2.

Figure 2:
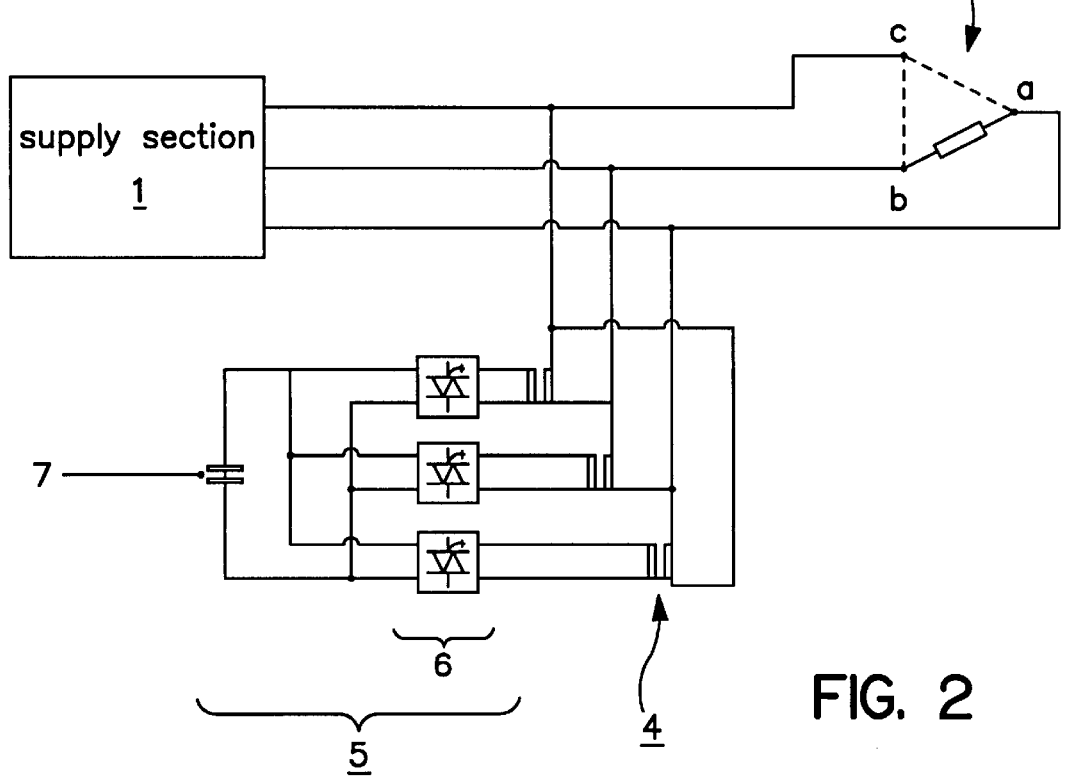
FIG. 2 shows a specific embodiment of the arrangement shown in FIG. 1.

FIG. 2 shows a specific embodiment of the arrangement according to the invention shown in FIG. 1, without any charging unit 8. The compensator unit 5 is connected in delta via a three-phase transformer unit 4 to the three phases R, Y and B of the transmission path between the supply section 1 and the load 2. A power switching element S1, S2 and S3, respectively, is provided on each of the secondary sides of the three-phase transformer unit, and the outputs of these switching elements are connected to a capacitor 7, which acts as an energy buffer store.

GTOs (Gate Turn-Off Thyristors) or IGBTs (Insulated-Gate Bipolar Transistors) may be used, for example, as the power switching elements S1 to S3.

In FIG. 2, the load 2 is represented by a reduced delta circuit, in which the unbalance comprises an impedance between the phases a and b. According to the invention, this unbalance is eliminated by using a compensator unit 5 so that the other loads or generators connected to the transmission path always find a balanced three-phase system, with the compensation for the unbalanced load being achieved by transferring power between the phases. The compensation method thus comprises a negative-sequence system (L. Gyugyi et. al, Principle and Applications of static, thyristor-controlled Shunt Compensators, IEEE Transactions on Power Apparatus and Systems, Vol. PAS-97, No. 5, September/October 1978, page 1937, right-hand column) which is produced by an unbalanced load being produced by a further negative-sequence system, which counteracts that first mentioned, thus resulting in an overall negative-sequence system, which is produced from these, in the respective three-phase system becoming zero, that is to say disappearing. The advantage of this method is that the volt-ampere ratings of the components, and thus the cost, are considerably lower than with the known methods.

Figure 3:
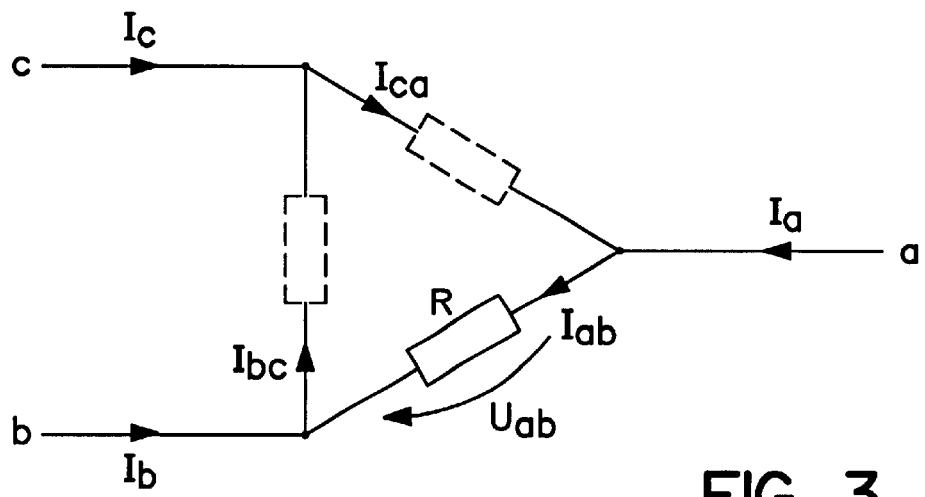
FIG. 3 shows an equivalent circuit of an unbalanced three-phase system.

The method according to the invention will be explained in the following text with reference to an unbalanced delta load as shown in FIG. 3, with the assumption that there is a pure resistive load R, which produces the unbalance, in the path ab.

For simplicity, it is also assumed that the resistor R leads to a current $I_{ab}$ with the normalized amplitude 1 pu in the corresponding path. This current $I_{ab}$ is in phase with the delta voltage $u_{ab}$ for the pure resistive load.

Figure 4:
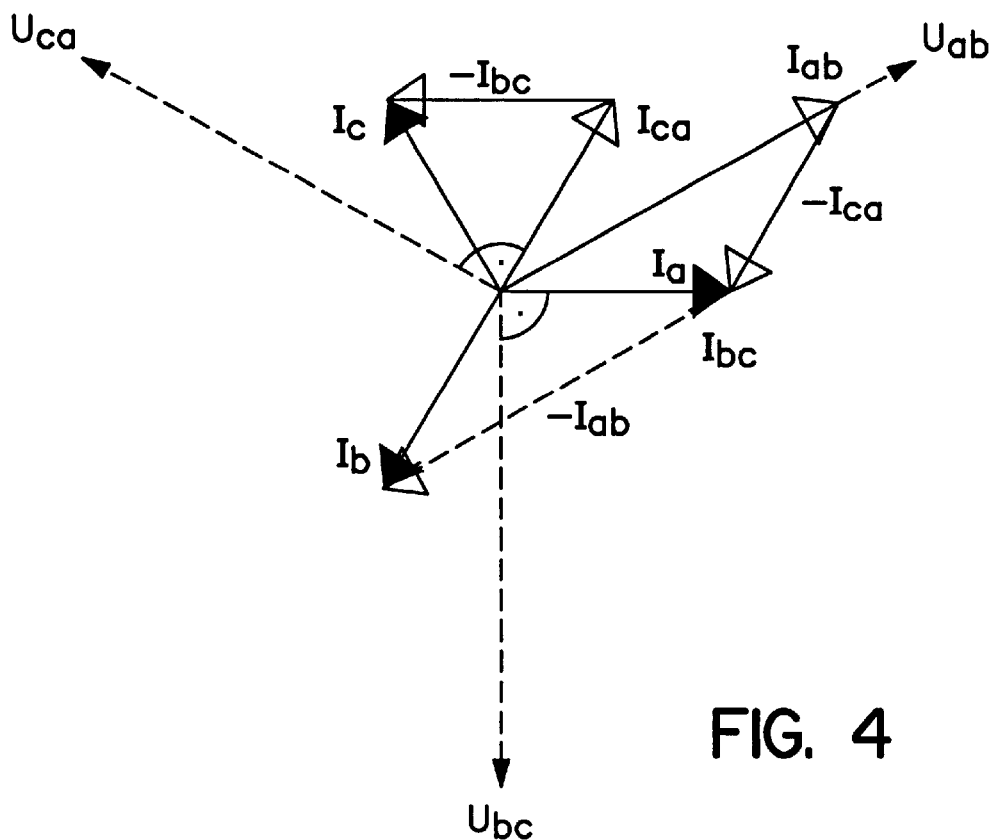
FIG. 4 shows a vector diagram of the unbalanced three-phase system shown in FIG. 3, with compensation by means of a Steinmetz circuit.

According to Steinmetz' method, the unbalanced three-phase system shown in FIG. 3 is compensated for in a known manner by connecting the phases a and b via an inductance and connecting the phases b and c via a capacitance, with the size of the inductance and the capacitance being chosen such that the respective current flowing through an element has an amplitude of 1/sqrt(3) pu. The current $I_{ca}$ in the path ca thus leads the voltage $u_{ca}$ by 90°, and the current $I_{bc}$ in the path bc thus leads the voltage $u_{bc}$ by 90°. This situation is shown in the vector diagram in FIG. 4, in which the phase currents can be obtained as follows:

$$I_a = I_{ab} - I_{ca}$$

$$I_b = I_{bc} - I_{ab}$$

$$I_c = I_{ca} - I_{bc}$$

Furthermore, in a balanced three-phase system $$I_a + I_b + I_c = 0.$$

On the above assumption that the amplitude of the load current is $I_{ab}$ 1 pu, a phase must be designed to transmit a power of 1/sqrt(3)=0.577. Remembering that the unbalanced load may be present in any of the paths ab, bc or ca, it must be possible to transmit the total power of 3*1/sqrt(3)=1.73 pu.

As mentioned, this result applies to purely resistive loads. Using an inductance and a capacitance, it is also possible to compensate for other loads which are not just purely resistive, but the required volt-amperes would not be distributed uniformly over the two paths ca and bc.

The method according to the invention now comprises not only exchanging the wattless component between the paths—between the paths ca and bc in the example shown in FIG. 3—but also exchanging real power between the paths via a buffer store, to be precise depending on the compensation requirement. In this case, the power is exchanged in such a way that the paths are loaded with compensation currents in as balanced a manner as possible, which means that the rating of the switching unit 5 (FIGS. 1 and 2) for a given maximum compensation watt-ampere level can be considerably reduced in comparison with known methods. For the example explained with reference to FIGS. 3 and 4, the method according to the invention results in a reduction in the volt-ampere rating of about 42% since, considered over the three phases, the volt-amperes provided with the method according to the invention are only 3*⅓=1 pu, in comparison with 1.73 pu with the classic Steinmetz method.

Figure 5:
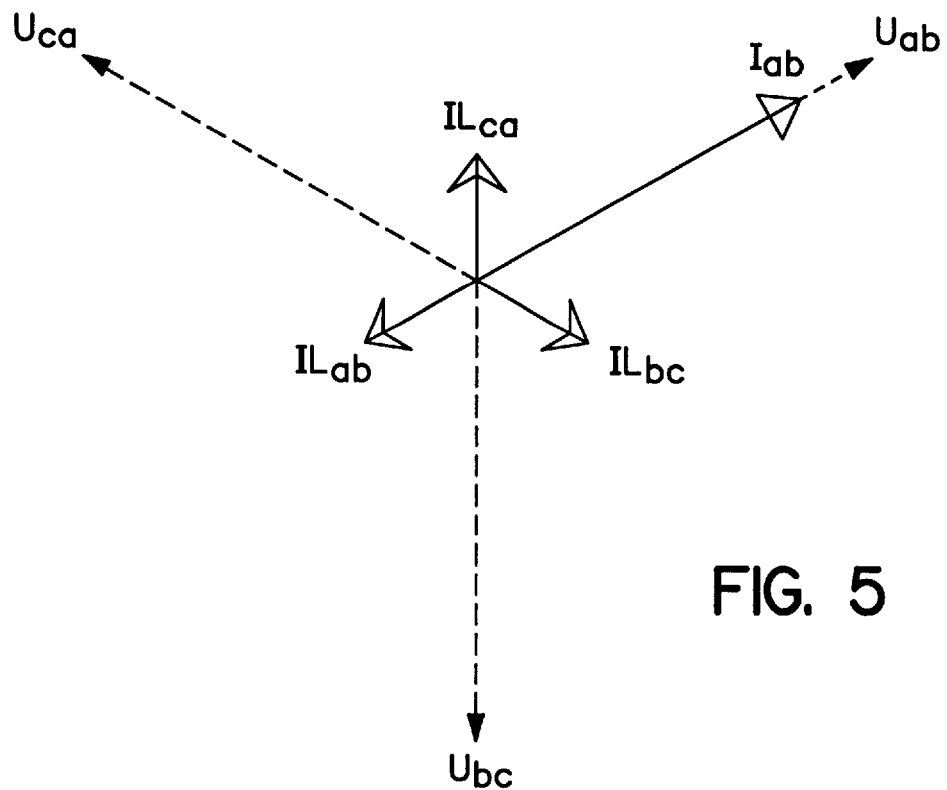
FIGS. 5 and 6 show vector diagrams of the unbalanced three-phase system shown in FIG. 3, with compensation by means of the method according to the invention.

FIG. 5 shows the compensation currents $IL_{ca}$, $IL_{ab}$ and $IL_{bc}$ which are used for compensation in the unbalanced three-phase system shown in FIG. 3. As can be seen, compensation currents flow in all the phases—namely with the amplitude ⅓ pu for each of the compensation currents $IL_{ca}$, $IL_{ab}$ and $IL_{bc}$—from which it is evident that not only the wattless component but also real power are exchanged between the paths. This is done via the said energy buffer store or via the energy storage unit 7 shown in FIGS. 1 and 2. The compensation currents are likewise balanced, that is to say they have identical amplitudes and corresponding phase differences of 120°.

Figure 6:
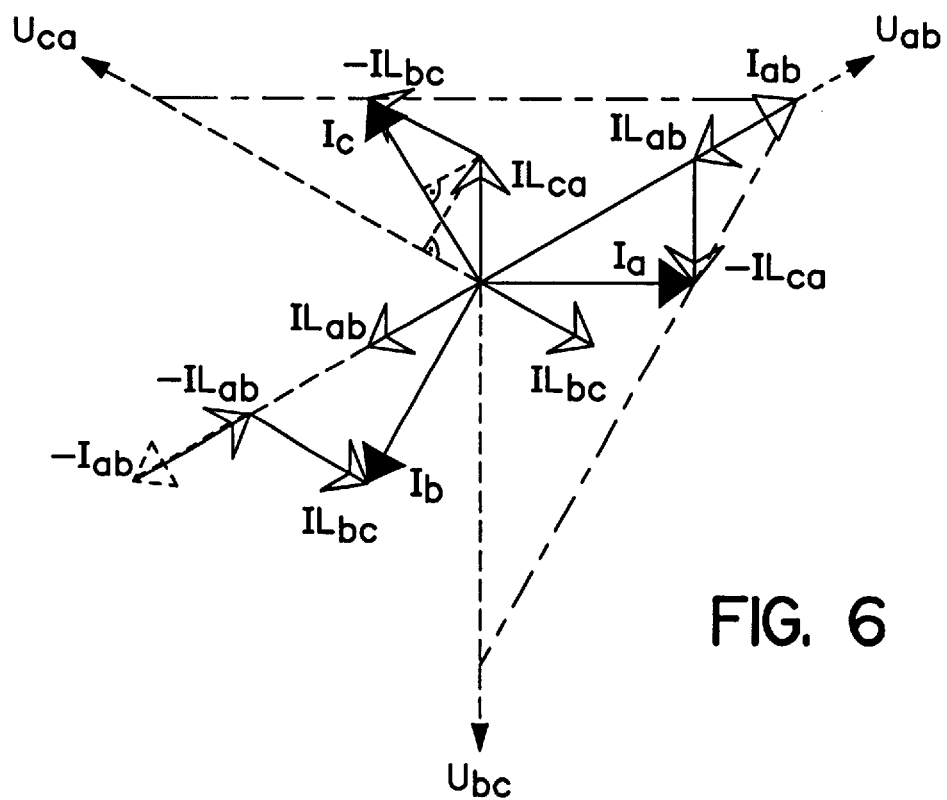

FIG. 6 shows the vector diagram to compensate for the unbalanced load R shown in FIG. 3. The corresponding equation system is as follows:

$$I_a = I_{ab} + IL_{ab} - IL_{ca}$$

$$I_b = -I_{ab} - IL_{ab} + IL_{bc}$$

$$I_c = IL_{ca} - IL_{bc}$$

and, if the system is balanced, then, of course, in addition:

$$I_a + I_b + I_c = 0$$

As mentioned, the current in the paths ca and bc is no longer purely reactive, but real power is exchanged between the paths via an energy buffer store. For example, in FIG. 6, the projection of the current vector $IL_{ca}$ onto the voltage vector uca gives the real component of the current. This means that the compensator according to the invention consumes real power, in other words energy is stored in the intermediate storage unit 7 (FIGS. 1 and 2). The stored energy is fed back into the path ab, as a result of which the energy in the storage unit 7 remains constant on average.

The above applications relate to a pure resistive load. The invention is, furthermore, also suitable to compensate for any impedances which, as is known, have a real and an imaginary component, the latter representing an inductive or capacitive component. The said advantages also apply equally to any impedances.

According to the invention, the energy stored in the energy storage unit can be distributed arbitrarily between the individual paths in the polyphase system. This may be used for further compensation purposes. For example, instead of using the teaching according to the invention to compensate for the fundamental frequency, as has been explained in detail above, it is feasible to use it to compensate for harmonics. The fundamental frequency and any harmonics can, of course, also be provided with compensation simultaneously. In this case, the total available volt-amperes may be greater than the figure of $3*\frac{1}{3}$ pu stated above. The volt-amperes actually required depend essentially on the desired distribution of the required volt-amperes between the individual paths.

The explanations relating to the exemplary embodiments are not limited to use with three-phase systems. Without departing from the idea of the invention, it is also feasible for the method according to the invention to be used successfully with polyphase systems in general.

What is claimed is:

1. A method to compensate for unbalanced loads in polyphase systems, comprising a compensation unit producing compensation currents which have arbitrary phases and/or arbitrary amplitudes, wherein real power is transferred from at least one phase to at least one other phase, and wherein the compensation currents are balanced.

2. The method as claimed in claim 1, wherein the compensation currents are produced by supplying energy to or taking energy from an energy storage unit.

3. The method as claimed in claim 1, wherein the amplitudes of the compensation currents are essentially of the same magnitude.

4. The method as claimed in claim 1, wherein the compensation currents are minimized.

5. An apparatus for carrying out the method as claimed in claim 1, wherein a compensation unit is provided, comprising a switching unit and an energy storage unit, wherein the energy storage unit can be connected to a polyphase system via the switching unit.

6. The apparatus as claimed in claim 5, wherein the switching unit can be connected to the polyphase system via a transformer.

7. The apparatus as claimed in claim 5, further comprising a charging unit, whose input side can be connected to the energy storage unit and whose output side can be connected to the polyphase system.

8. The apparatus as claimed in claim 5, wherein the energy storage unit is in the form of a capacitor.

9. The apparatus as claimed in claim 5, wherein the switching unit comprises GTO (Gate Turn Off) thyristors or IGBTs (Insulated-Gate Bipolar Transistors).

10. The apparatus as claimed in claim 5, wherein the apparatus is connected to a three-phase system to compensate for unbalanced loads in the three-phase system.

11. The apparatus as claimed in claim 5, wherein the switching unit comprises IGBTs (Insulated-Gate Bipolar Transistors).

* * * * *